United States Patent [19]

Sugiyama

[11] Patent Number: 4,931,680

[45] Date of Patent: Jun. 5, 1990

[54] SIDE MOUNTING STARTER WITH BEVEL GEAR OUTPUT

[75] Inventor: Takeshi Sugiyama, Hyogo, Japan

[73] Assignee: Mitsubishi Cenki Kabushiki Kaisha, Tokyo, Japan

[21] Appl. No.: 330,860

[22] Filed: Mar. 31, 1989

[30] Foreign Application Priority Data

Apr. 1, 1988 [JP] Japan .................................. 63-44916

[51] Int. Cl.[5] ...................... H02K 7/118; F02N 15/02

[52] U.S. Cl. ....................................... 310/83; 74/7 A; 74/417; 123/179 M; 310/80

[58] Field of Search .................... 74/7 A, 7 E, 8, 417; 123/179 M, 179 R; 310/80, 83, 78

[56] References Cited

U.S. PATENT DOCUMENTS

| | | | |
|---|---|---|---|
| 1,364,853 | 1/1921 | Hartford | 123/179 M |
| 3,796,102 | 3/1974 | Chamberlain | 74/8 |
| 4,440,033 | 4/1984 | Kurihara et al. . | |
| 4,739,181 | 4/1988 | Okamoto et al. . | |

FOREIGN PATENT DOCUMENTS

| | | | |
|---|---|---|---|
| 573070 | 6/1924 | France | 310/83 |
| 519246 | 3/1955 | Italy | 74/7 E |

*Primary Examiner*—Patrick R. Salce
*Assistant Examiner*—D. L. Rebsch
*Attorney, Agent, or Firm*—Sughrue, Mion, Zinn, Macpeak & Seas

[57] ABSTRACT

The output rotary shaft of a starter has a pinion slidably mounted so as to engage with the engine ring gear. The output shaft axis intersects that of the armature rotary shaft of the motor. The two shafts are engaged with each other through bevel gears so that the rotation of the armature rotary shaft is transmitted through the output rotary shaft to the pinion, thereby to rotate the engine ring gear. By this structure, the motor can be positioned farther from the gear box casing without an effect on the starter manufacturing cost and efficiency.

4 Claims, 1 Drawing Sheet

SIDE MOUNTING STARTER WITH BEVEL GEAR OUTPUTcBACKGROUND OF THE INVENTION 1. (Field of the Invention)

This invention relates to starter devices, and more particularly to a so-called "side mount type starter device" which is installed on the gearbox casing of a vehicle.

2. (Prior Art)

A conventional side mount type starter device is designed as shown in FIG. 2. In FIG. 2, reference numeral 1 designates the starter device; 2, a DC motor; 2a, the armature rotary shaft of the motor 2; 3, a gear formed on the end portion of the armature rotary shaft 2a; 4, an output rotary shaft arranged in parallel with the armature rotary shaft 2a; 5, a reduction spur gear which is fixedly mounted on the output rotary gear 4 and engaged with the gear 3 to transmit the rotation of the armature rotary shaft 2a at à speed reduction ratio; 6, a one-way clutch slidably mounted on the output rotary shaft 4; 7, an electro-magnetic switch unit arranged beside the DC motor 2; and 8, shift lever. One end of the shift lever 8 is engaged with the plunger 7a of the electro-magnetic switch unit 7, while the other end is engaged with the peripheral ring of the oneway clutch 6.

The one-way clutch 6 comprises: a clutch outer portion which is engaged with the helical spline gear of the output rotary shaft 4 and rotated together with the latter 4; and a clutch inner portion to which the rotation of the clutch outer portion is transmitted through rollers. A pinion 9 is provided on the prolongation of the axis of the clutch inner portion in such a manner that it is integral with the clutch inner portion, and it is engaged with and disengaged from the engine ring gear (not shown in FIG. 1 as element 16).

The side mount type starter device 1 is installed with a small clearance between the DC motor 2, namely, a motor section and the gearbox casing or the engine cylinder block. Because of this small clearance between the motor section and the gear box casing, it takes a relatively long time to determine the arrangement thereof. If the number of teeth and the diameter of the pinion 9 are increased, then the starter device may be installed with the distance between the motor section and the gear box casing increased. However, this method is disadvantageous in that the torque of the starter device is decreased as much. This difficulty may be eliminated by employment of the following method: In the case of the above-described starter device with the internal reduction gear, the specification of the reduction gear is modified to provide a special purpose reduction gear or to increase the reduction gear ratio so that, the number of teeth and the diameter of the pinion 9 are increased with the torque maintained unchanged. In order to increase the reduction gear ratio, it is necessary to increase the number of teeth of the reduction spur gear 5. In this case, the diameter of the gear is increased. However, because of the clearance between the reduction spur gear and the gear box casing, it is not practical to increase the diameter of the gear. If the special purpose reduction gear is employed, then unavoidably the starter device will be increased in manufacturing cost and decreased in manufacturing efficiency.

SUMMARY OF THE INVENTION

Accordingly, an object of this invention is to eliminate the above-described difficulties accompanying a conventional starter device.

More specifically, an object of the invention is to provide a starter device which can be manufactured with high efficiency, and can be installed with a sufficiently large clearance between the motor and the gear box casing.

The foregoing object and other objects of the invention have been achieved by the provision of a starter device which, according to the invention, comprises: an electric motor; an output rotary shaft which is so arranged that its axis intersects the axis of the armature rotary shaft of the electric motor; a pair of bevel gears secured to the armature rotary shaft and the output rotary shaft, respectively, and engaged with each other to transmit the rotation of the armature rotary shaft to the output rotary shaft at a reduction gear ratio; and a pinion slidably mounted on the output rotary shaft, the pinion being detachably engaged with an engine ring gear.

In the starter motor, when the pinion is slid on the output rotary shaft to abut against the engine ring gear, the motor is driven. The rotation of the armature rotary shaft is transmitted through the bevel gears to the output rotary shaft at a predetermined reduction gear ratio. As a result, the pinion is rotated, and completely engaged with the engine ring gear, thus rotating the latter thereby to start the engine. Since the motor is so arranged that the axis of the armature rotary shaft intersects the axis of the output rotary shaft, the motor can be positioned farther from the output rotary shaft which is provided on the side of the gear box casing.

The invention, both as to its organization and method of operation, together with further objects and advantages thereof may best be understood by reference to the following detailed description when read in conjunction with the accompanying drawings, in which like parts are designated like reference numerals or characters.

DETAILED DESCRIPTION OF THE PREFERRED EMBODIMENT

Figure 1:
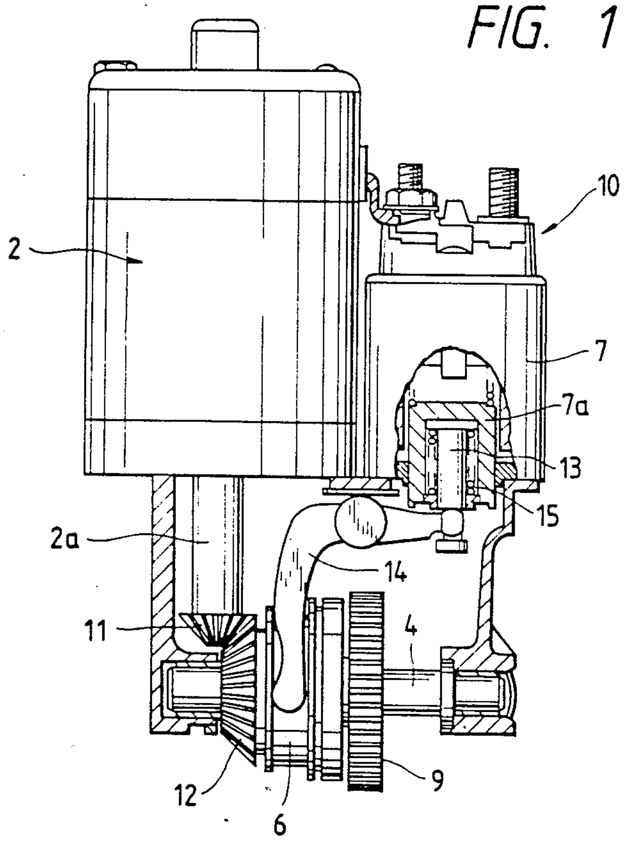
FIG. 1 is a front view, with parts cut away, showing one example of a starter device according to this invention.
Figure 2:
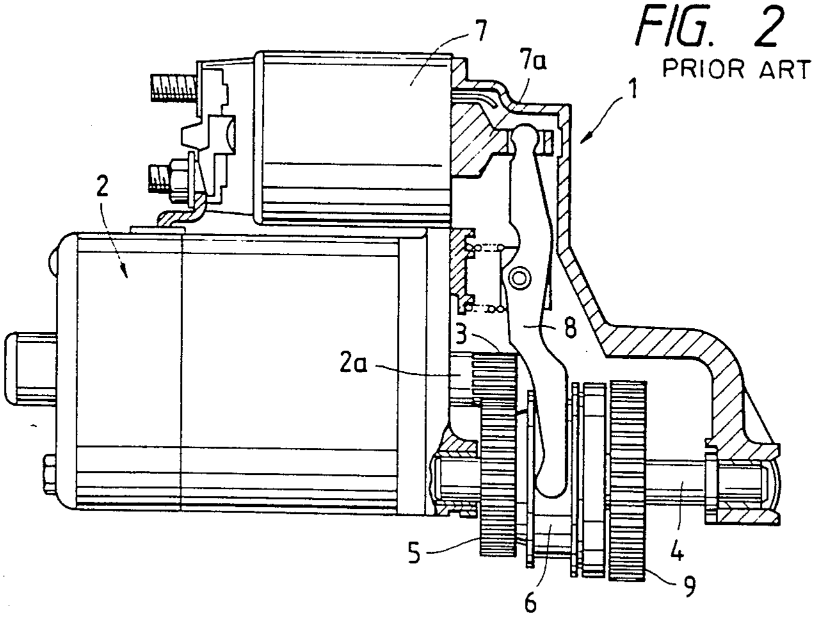
FIG. 2 PRIOR ART
FIG. 2 is a front view, with parts cutaway, showing a conventional starter device.

One example of a starter device according to this invention will be described with reference to FIG. 1, in which components corresponding functionally to those already described with reference to FIG. 2 are therefore designated by the same reference numerals or characters.

As shown in FIG. 1, in the starter device 10 of the invention, an output rotary shaft 4 intersects forms right angles with the axis of the armature rotary shaft 2a of a DC motor 2. A small bevel gear 11 is mounted on the end of the armature rotary shaft, and a large bevel gear 12 is mounted on the output rotary shaft 4. Those bevel gears 11 and 12 are engaged with each other to transmit the rotation of the armature rotary shaft 2a to the output rotary shaft 4 at a speed reduction ratio. An electromagnetic magnetic switch unit 7 is arranged beside the DC motor 2 which, as was described above, is held vertical to the output rotary shaft 4 extended horizontally. The switch unit 7 has a plunger *7a*, to which a hook 13 is coupled through a compression spring 15 so that the hook 13 is operated in association with the plunger *7a*. One end of an L-shaped shift lever 14 is coupled to the hook 13, and the other end is engaged with the peripheral ring of a one-way clutch 6.

The starter device 10 is installed on the gear box casing (not shown) with stays etc. in such a manner that the output rotary shaft 4 is in parallel with the axis of the gear box casing; that is, the DC motor is set vertically away from the gear box casing. As a result, the layout of the start device can be readily determined. As is apparent from the above description, in the starter device of the invention, the DC motor can be moved away from the gear box casing to a desired position merely by changing the length of the armature rotary shaft of the DC motor. That is, the starter device of the invention can be readily mounted on the gear box casing.

As was described above, in the starter device of the invention, the armature rotary shaft and the output rotary shaft are so arranged that their axes intersect each other, and they are operatively coupled to each other through the bevel gears. Therefore, in installing the starter device on the gear box casing, the motor can be set farther from the gear box casing than in the case of the conventional starter device. That is, the starter device of the invention can be installed with a high degree of freedom.

What is claimed is;

1. A starter device comprising:

an electric motor having an armature rotary shaft;

an output rotary shaft arranged to intersect the axis of said armature rotary shaft of said electric motor in the axial direction thereof;

a pair of bevel gears secured to said armature rotary shaft and said output rotary shaft, respectively, and engaged with each other to transmit the rotation of said armature rotary shaft to said output rotary shaft at a reduction gear ratio;

a pinion slidably mounted on said output rotary shaft and detachably engaged with an engine ring gear; and a clutch means for providing said detachable engagement of said pinion.

2. A starter device as claimed in claim 1, wherein the distance between said electric motor and a gear box is determined by the axial length of said armature rotary shaft.

3. A starter device comprising:

an electric motor having an armature rotary shaft;

an output rotary shaft arranged to intersect the axis of said armature rotary shaft of said electric motor in the axial direction thereof;

a pair of bevel gears secured to said armature rotary shaft and said output rotary shaft, respectively, and engaged with each other to transmit the rotation of said armature rotary shaft to said output rotary shaft at a reduction gear ratio;

a pinion slidably mounted on said output rotary shaft and detachably engaged with an engine ring gear;

an electromagnetic switch unit arranged beside said electric motor;

a one-way clutch slidably mounted on said output rotary shaft; and a shaft lever with one end engaged to said electromagnetic switch unit, and the other end engaged to said one-way clutch, said shift lever being of L-shape.

4. A starter device as claimed in claim 3, wherein said electromagnetic switch unit includes a plunger, a compression spring, and a hook coupled to said plunger through said compression spring, the one end of said shift lever being coupled to said plunger.

* * * * *